United States Patent [19]

Rawicki

[11] 4,178,133

[45] Dec. 11, 1979

[54] DOUBLE-ACTING FLEXIBLE TUBE PUMP

[75] Inventor: Waldemar Rawicki, Chicago, Ill.

[73] Assignee: Binks Manufacturing Company, Franklin Park, Ill.

[21] Appl. No.: 787,358

[22] Filed: Apr. 14, 1977

[51] Int. Cl.² .................. F04B 21/00; F04B 35/02; F04B 43/10; F16J 15/44

[52] U.S. Cl. ..................... 417/63; 417/389; 417/394; 277/2; 277/48; 277/59

[58] Field of Search .............. 417/389, 63, 394, 478, 417/395, 521; 92/165 R, 92; 277/2, 3, 29, 47, 50, 48, 51, 59, 124; 64/15 B; 151/52; 285/13; 137/314

[56] References Cited

U.S. PATENT DOCUMENTS

| 253,886 | 2/1882 | Over | 151/52 |
|---|---|---|---|
| 577,570 | 2/1897 | Williston | 277/29 |
| 580,049 | 4/1897 | Heim et al. | 277/2 |
| 1,282,145 | 10/1918 | Tobler | 417/394 |
| 2,968,169 | 1/1961 | Davis | 64/15 B |
| 3,153,381 | 10/1964 | Holley | 417/395 |
| 3,318,251 | 5/1967 | Smith | 417/478 |
| 3,591,319 | 7/1971 | Shlisky | 417/DIG. 1 |
| 3,609,067 | 9/1971 | Wright | 417/389 |
| 3,749,411 | 7/1973 | Lennon | 277/2 |
| 3,776,558 | 12/1973 | Maurer et al. | 277/58 |
| 3,859,011 | 1/1975 | Hart | 417/389 |
| 3,914,752 | 10/1975 | Howard et al. | 417/63 |
| 3,983,958 | 10/1976 | Swearingen | 417/63 |
| 3,987,775 | 10/1976 | O'Connor | 417/478 |

Primary Examiner—Carlton R. Croyle
Assistant Examiner—Thomas I. Ross
Attorney, Agent, or Firm—Gary, Juettner & Pyle

[57] ABSTRACT

A pump, characterized by flexible tubes which are cyclically expanded and contracted to cause fluid to be pumped, comprises a pair of liquid filled cylinders each containing a flexible tube connected to inlet and outlet valves, a liquid filled control cylinder communicating at its opposite ends with respective ones of said pump cylinders, and a piston reciprocable in said control cylinder for alternately transferring fluid to and from said pump cylinders for alternately and cyclically expanding and contracting said tubes to cause fluid to be pumped in a double acting pump action. The pump is especially well suited for pumping abrasive and corrosive slurries, heavily pigmented and/or metal filled coating materials and the like. The pump is characterized by improved piston means, improved sealing and retaining means for both the piston and the tubes, and means for detecting leakage across the piston, whereby to increase pump reliability and longevity of service, and to monitor internal pump conditions.

The basic objective is a pump design providing both perfect vacuum retention and perfect pressure retention, as well as miniscule liquid leakage, over millions of cycles of pump operation.

2 Claims, 7 Drawing Figures

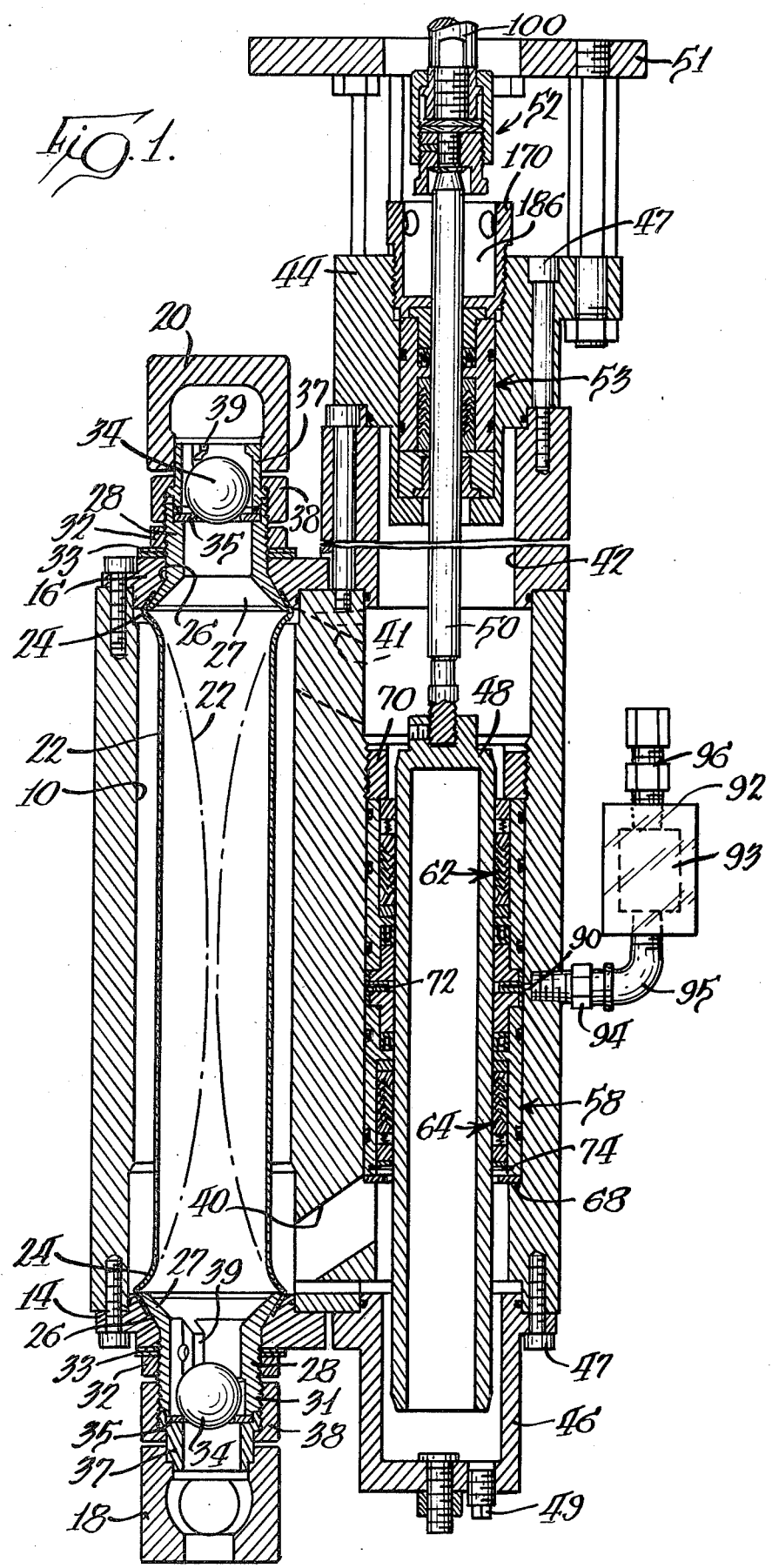

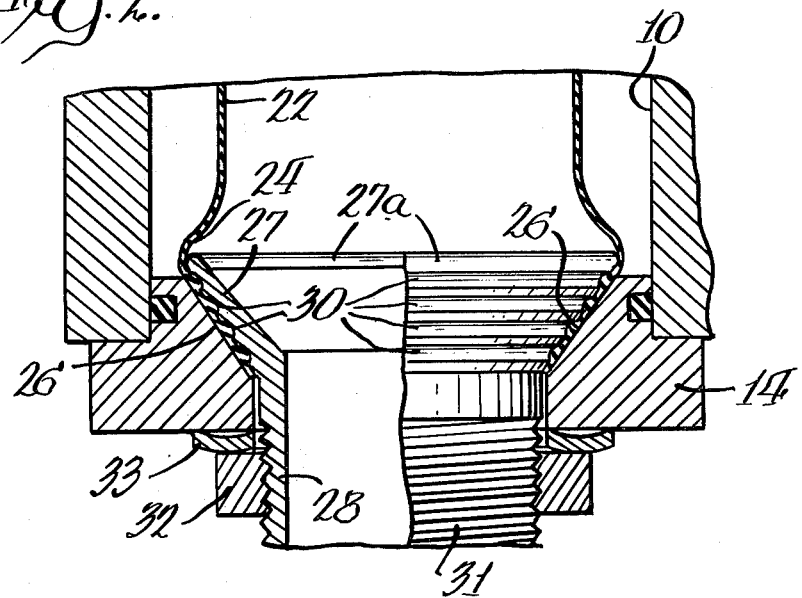
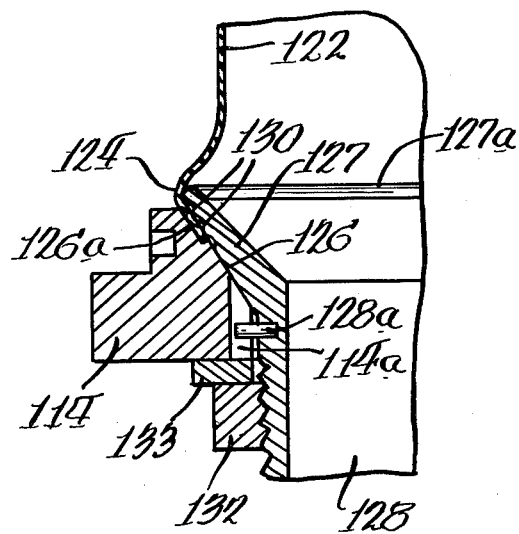
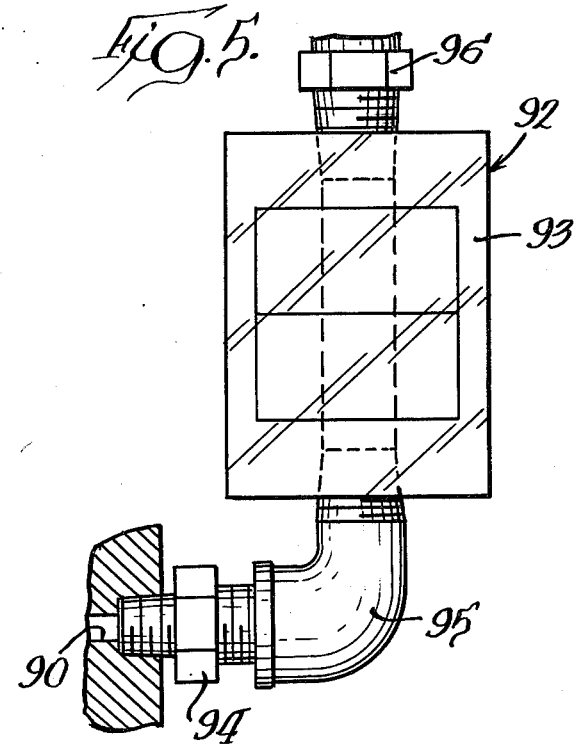

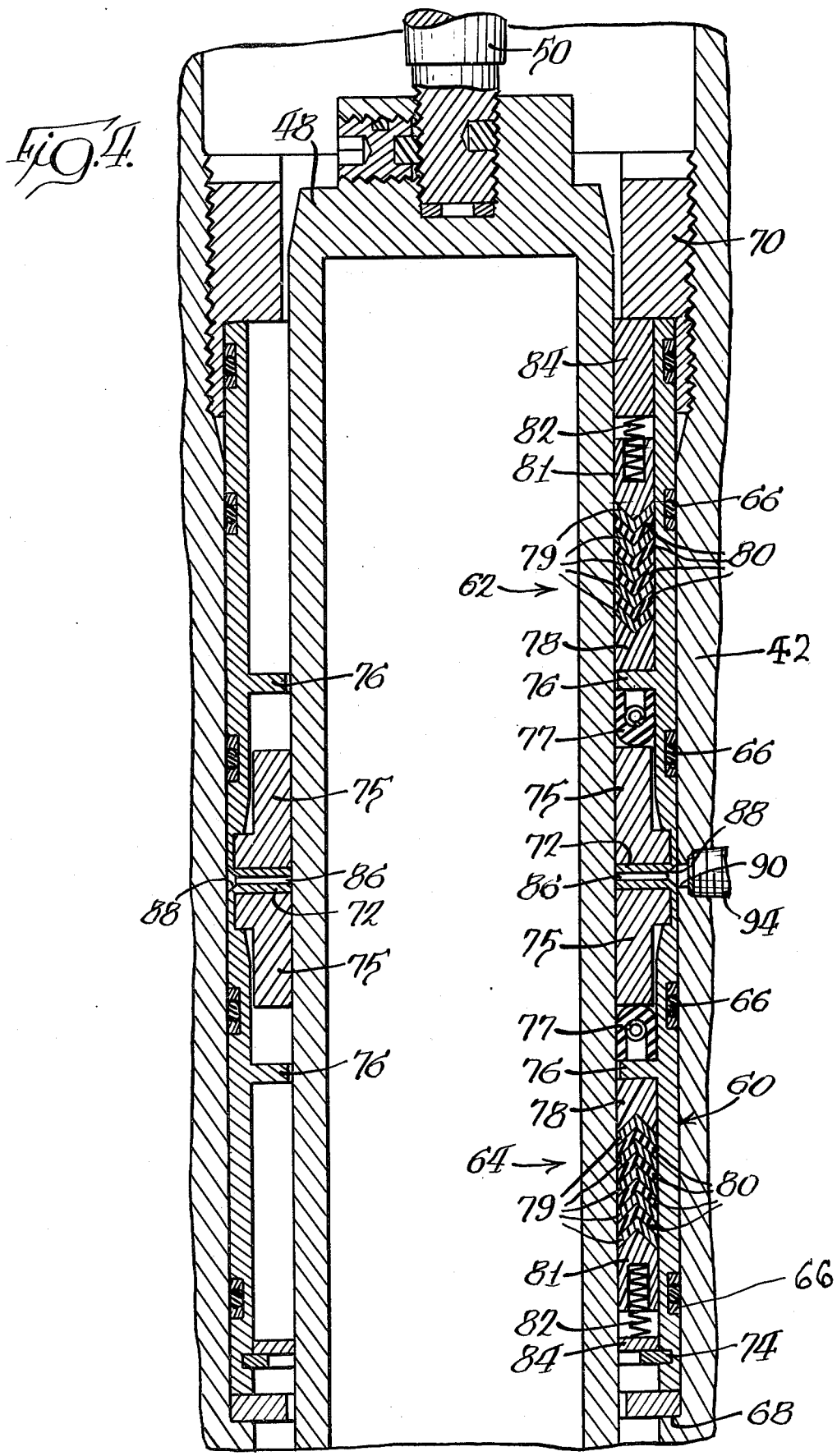

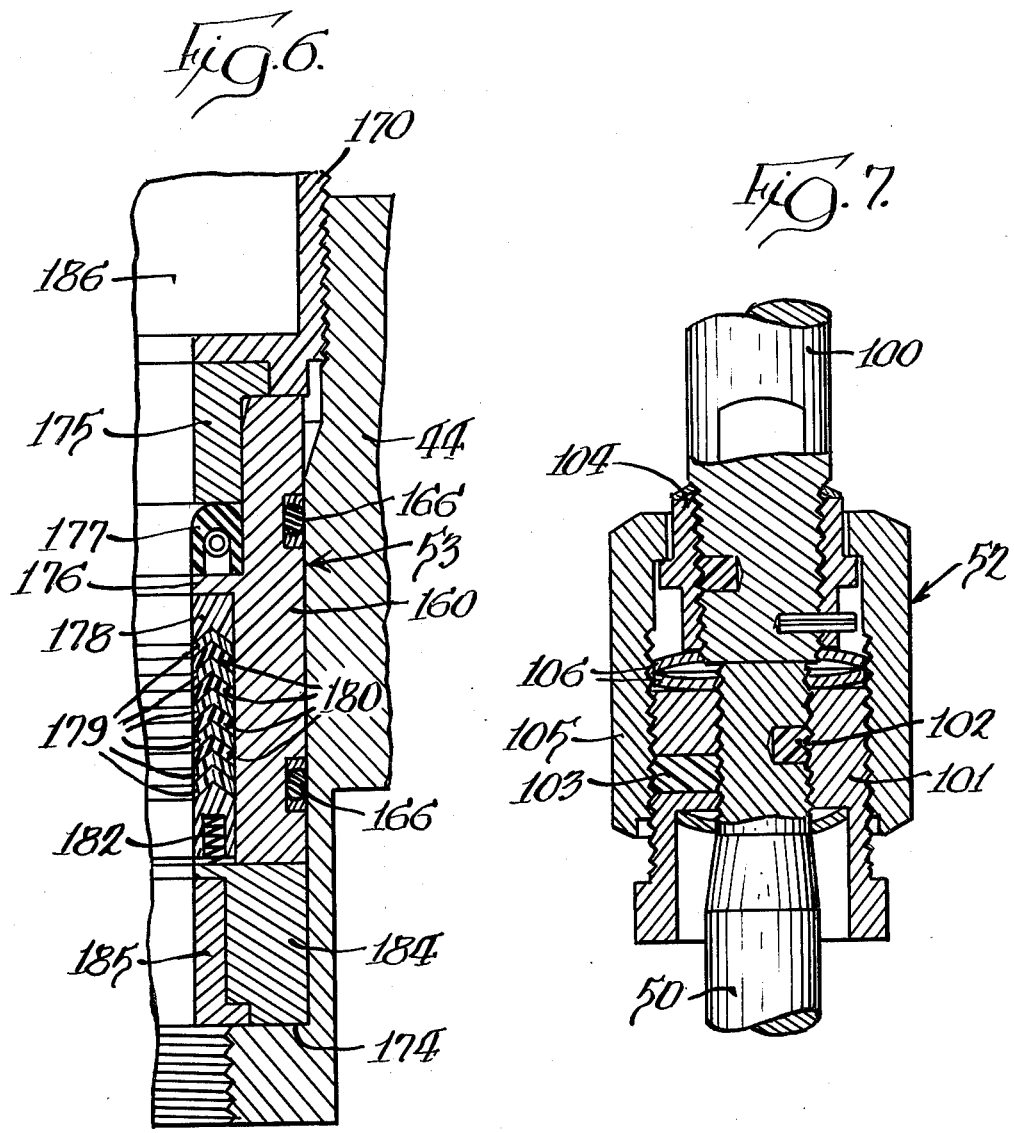

DOUBLE-ACTING FLEXIBLE TUBE PUMP

BACKGROUND OF THE INVENTION

The present invention relates to pumps suitable for pumping abrasive and corrosive slurries and the like, and more particularly, to a pump having flexible tubes which are cyclically expanded and contracted to cause the fluid to be pumped.

A flexible tube pump of the general type is shown in U.S. Pat. No. 1,282,145, issued Oct. 22, 1918, to Henri Tobler. Tobler shows a double acting pump comprising a pair of liquid filled cylinders each containing a flexible tube connected to inlet and outlet valves in the cylinders; the cylinders are in communication with opposite ends of a third or control cylinder which contains a piston, the piston being driven by a piston rod extending from one side of the piston and through one end of the control cylinder. Movement of the piston forces liquid alternately into one and out of the other of the pair of pump cylinders to alternately expand and collapse the flexible tubes in alternation to one another whereby to pump fluid continuously from the pump outlet. The Tobler pump suffers the problem of unequal transfer of fluid from the control cylinder to the two pump cylinders, and thus by-pass of liquid around the piston and consequent danger of pump destruction, because of the unequal effective areas of the opposite sides of the piston due to the location of the piston rod on one side only of the piston.

In U.S. Pat. No. 3,609,067, issued Sept. 28, 1971, to Allen C. Wright, a similar pump is shown equipped with a second or balance rod on the opposite side of the piston and extending through the opposite end of the control cylinder, so that the piston areas on both sides are equal and serve to transfer equal volumes of liquid from the control cylinder to each of the two pump cylinders. Theoretically, this should have solved the problem inherent in the Tobler pump.

However, it was soon discovered that the requisite perfect concentricity between the piston rod, the piston, the balance rod and the seals therefor could not be effectively maintained for any prolonged period of time in the service for which the pump was intended. The presence of the balance rod appeared to hasten seal deterioration. Consequently, liquid would by-pass the seal between the piston and the control cylinder, resulting in unequal transfer of fluid from the control cylinder to the two pump cylinders and consequent danger of pump destruction.

Another problem with the flexible tube pumps of the prior art has been failure of the tubes themselves, especially at their seals with the inlet and outlet valves. Both Tobler and Wright (see particularly U.S. Pat. No. 3,489,096, issued Jan. 13, 1970) retained the ends of the flexible tube by ridgedly clamping them between a pair of smooth surfaced, frusto-conical members which were drawn tight against the tube end by threaded fastener means. In such structure, due to manufacturing tolerances and irregularities, the clamping pressure was unequal resulting in concentrated or localized stress in the tube and early stress failure under the repeated expansion and contraction of the tube in use.

SUMMARY OF THE INVENTION

The present invention provides a flexible tube pump overcoming the above-discussed disadvantages of the prior art, and affording additional advantages, whereby to provide a pump having an excellent service life and particular ease of maintenance.

In particular, the balance rod of Wright and its consequent disadvantages have been eliminated; the piston has been made hollow and so designed as to maintain a high though not perfect degree of balance between the liquid transferred from the control cylinder to each of the pump cylinders; and the seal between the piston and the cylinder has been greatly improved; whereby a good liquid pressure balance is maintained between the two sides of the piston and the piston is effectively sealed so that there is no leakage past the piston over a long service life.

Second, the piston seal has been improved by the addition of low pressure back-up seals which allow the pump to be operated at far lower pressures as well as far higher pressures than heretofore possible.

Third, means have been provided for detecting, indicating and harmlessly diverting pump liquid leakage past the piston seal when it starts to fail so that the seal can be replaced at the proper time before any damage is done to other components of the pump.

Fourth, the piston rod has been equipped with a self-aligning coupling for connection with the pump operating motor whereby to minimize sideward stress on the seals, thereby to improve the service life of the seals. Also, an improved seal for the piston rod has been provided.

Fifth, improved means are provided for clamping the flexible tubes to the inlet and outlet valves for uniformly distributing effective clamping pressures to the periphery of the tube without excessive extrusion of the tubes and without localized stress, whereby to mount the tubes for long and effective service life.

The improved seal for the piston is characterized by a cartridge containing two separate, one-way seal assemblies which provide far greater sealing efficiency for both low and high pressures than seal constructions intended to seal in both directions of piston movement. Also, this construction facilitates leakage detection and prompt remedial pump service.

Other improvements and advantages provided by the present invention will become apparent from the accompanying drawings and the following detailed description.

BRIEF DESCRIPTION OF THE DRAWINGS

FIG. 1 is a vertical sectional view of a flexible tube pump constructed in accordance with the present invention;

FIG. 2 is a fragmentary, enlarged, vertical-sectional view of one flexible tube mounting means provided in accordance with the invention;

FIG. 3 is a fragmentary, enlarged, vertical-sectional view of a second tube mounting means provided in accordance with the invention;

FIG. 4 is a fragmentary, enlarged, vertical-sectional view of the improved piston seal provided by the invention, a portion thereof being broken away to better illustrate the cartridge construction;

FIG. 5 is a side elevational view of the means provided by the invention for detecting and indicating seal leakage, and for lubricating the seals to extend their service life;

FIG. 6 is a fragmentary, enlarged, vertical-sectional view of the improved seal for the piston rod; and FIG. 7 is a fragmentary, enlarged, vertical-sectional view of the self-aligning coupling for connecting the piston rod to the pump operating motor.

DESCRIPTION OF THE PREFERRED EMBODIMENT

Referring to FIG. 1, a double acting flexible tube pump comprises a pair of pump cylinders 10 (only one being shown), each of which includes a pair of end plates 14 and 16, removably secured thereto, as by threaded fasteners (not shown). Each of the end plates 14 and 16 has an opening therein which aligns with the cylinder and, respectively, with an inlet manifold 18 and an outlet manifold 20 for conducting pumped fluid to and from the pump.

A tube 22 of a flexible and/or stretchable material, preferably Teflon, is located within each of the cylinders 10, the ends 24 of the tube being in communication with the inlet and outlet manifolds 18 and 20 through the holes in the end plates 14 and 16, respectively. One mode of mounting a tube end at the inlet manifold is shown in detail in FIG. 2, it being understood that the opposite or outlet end is mounted in the same manner. Referring to FIG. 2, a smooth frusto-conical surface 26 is provided around the inlet opening on the interior surface of the end plate 16, with the large diameter thereof at the inside of the cylinder. The surface 26 receives thereon one end of the tube 22 into which a male frusto-conical portion 27 of a connecting stem 28 has been inserted. The tube stretches to accommodate the portion 27 which at its one end is of far larger diameter than the nominal diameter of the tube. Instead of being smooth, the frusto-conical portion 27 of the stem 28 has a plurality of circumferential sealing grooves 30 therein to enhance the seal between the tube end 24 and the frusto-conical surfaces 26 and 27. The outer portion of the stem 28 extends through the opening in the plate 16 and is threaded at its outer end portion 31 to receive a nut or similar fastener 32. Confined between the fastener 32 and the end plate 16 are one or more resilient washer elements, such as a Bellville spring washer 33.

When the nut 32 is tightened onto the stem 28, the end 24 of the tube 22 is tightly confined and compressed between the frusto-conical surfaces 26 and 27 and is physically deformed to define circumferential beads or ridges extending into and locked within the grooves 30 in the surface 27. As a consequence, the tube end is securely locked in place without undue stress thereon. Also, as the nut is tightened, the washer 33 due to its resiliency and/or yieldability causes the force being exerted on the nut to be uniformly distributed over the surfaces 26 and 27, whereby stress is exerted uniformly over the tube end and failure causing localized stress is avoided. Furthermore, when the nut has been fully tightened to a predetermined torque setting, the washer 33 maintains a constant and uniform pressure on the tube end despite the inherent tendency of the Teflon to extrude. Thus, the tube end is safely and securely, but detachably affixed to the cylinder end plate and the associated pump manifold.

As will become clear from the later description herein of the operation of the pump, the tube 22 is cyclically flexed around the lip of the frusto-conical portion 27 of the stem 28 and tube failure has heretofore occurred at the locus of this flexing movement. I have discovered that tube life is greatly extended by coating the lip of the frusto-conical portion, in the manner indicated at 27a, with a material having a low coefficient of friction and a high degree of surface smoothness; the preferred material being Teflon because it possesses these particular characteristics and also is compatible with the material from which the tubes are formed.

An alternate or second mode of mounting the tube ends, which is preferred for higher pressure applications, is shown in FIG. 3 wherein the same numerals have been used as in FIG. 2, except in the one-hundred series. The principal departure from FIG. 2 resides in the fact that the end 124 of the flexible tube 122 overlies only a portion of the outer wall of the frusto-conical portion 127 of the stem 128 and that the frusto-conical surface 126 of the end plate 114 is undercut at the large diameter end thereof, as indicated as 126a, to receive the end portion of the tube with a precise, predetermined interference fit. Also, the stem and end plate are keyed together by means of a pin 128a on the stem 128 and a slot 114a in the end plate 114 to prevent relative rotation therebetween. With this structure, when the nut 132 is tightened, a very precise and controlled compressive extrustion force is applied to the tube end, whereby to hold the tube end in place without excessive extrusion; the control thereover being attained by bringing the smaller diameter ends of the frusto-conical surfaces 126 and 127 into metal to metal contact. The control thus provided prevents total "Teflon" tube extrusion at operating pressures above 1600 psi, and provides a very secure mounting for the tube ends. Also, the lip of the stem 128 is coated with Teflon as indicated at 127a to enhance the service life of the tube.

Referring again to FIG. 1, one-way inlet and outlet valves are provided for the respective ends of each of the tubes. Each valve comprises a ball 34 normally engaging a reversible valve seat 35 in the form of a washer that is confined between the outer end of the stem 28 and a manifold adapter fitting 37. Each fitting 37 is threadedly or otherwise secured in the respective manifold and the respective stem 28 is secured thereto by a coupler 38 threadedly engaging the respective stem. Thus, the valves are readily accessible for replacement of both the valve ball 34 and the seat 35 in the event of excessive wear, as frequently occurs in the pumping of highly abrasive fluids. To minimize valve wear and replacement, the balls 34 and the seats 35 may be formed of an abrasion resistant material such as a carbide, and the valve seats 35 are reversible thereby effectively to double their service life. To control movement of the valve balls and to maintain them associated with their seats, ball retainer ridges or projections 39 are provided on the interior of each of the inlet stem 28 and outlet fitting 37.

Contiguous to the two pump cylinders 10, and preferably intermediate and to one side of the same, the main body member of the pump defines a third cylinder 42, herein called the control cylinder. This cylinder is provided approximately midway of its length with a seal, indicated generally at 58, which slidably receives a piston 48 mounted for reciprocable movement within the cylinder. The cylinder 42 is closed at its opposite ends by end caps 44 and 46, suitably secured to the cylinder by bolts 47, and a piston rod 50 secured to the piston at its upper side extends slidably through the upper one 44 of the caps.

The upper, outer end of the piston rod 50 is provided with coupling means indicated generally at 52 (to be described in detail hereinafter) facilitating connection thereto of a reciprocatory power source, such as a reciprocating air motor (not shown) for driving the pump.

The air motor may be appropriately secured to mounting plate 51 provided at the top of the pump. The upper end cap 44 contains a seal 53 for the piston rod which will be described later herein. The lower end cap 46 is sealingly secured to the cylinder and includes a removable filler plug 49 for filling and draining the lower pump chamber.

The control cylinder 42 communicates adjacent its upper end via a port 41 (shown in dotted lines) with one of the pump cylinders 10 (the one not shown) and adjacent its lower end, i.e., below the seal 58, with the other pump cylinder 10 via a port 40. The three cylinders are filled with an incompressible liquid, preferably oil, so that upon reciprocation of the piston 48 by the associated reciprocating power source oil is (a) forced into the one pump cylinder 10 via the port 41 and withdrawn from the other pump cylinder 10 via the port 40 on the upstroke of the piston (as the same is shown in FIG. 1) and (b) forced into said other pump cylinder via the port 40 and withdrawn from said one pump cylinder via the port 41 on the downstroke of the piston. The ports 40 and 41 are approximately three times the size of the ports utilized in prior art structures, which produces the advantages of providing low velocity and thus low-impact fluid flow into the pump cylinders on the pressure stroke and avoiding cavitation of the cylinders on the suction stroke. Consequently, on the upstroke of the piston, the tube 22 in said one pump cylinder is squeezed or contracted and the tube 22 in said other pump cylinder is released and expanded; and on the downstroke of the piston, the tube 22 in said one pump cylinder is expanded and the tube 22 in said other pump cylinder is contracted. Consequently, as the piston is reciprocated, and the tubes are alternately and cyclically expanded and contracted, fluid to be pumped is alternately drawn into each tube while being pumped out of the other tube. The assembly thus provides a highly efficient double acting pump. Since the fluid being pumped is exposed only to the interior of the tubes, the valves and the manifolds, and does not come in contact with metal to metal relatively moving components, highly abrasive materials can be pumped with great facility.

However, because there is a differential between the areas of the effective or exposed surfaces of the two sides or ends of the piston, the rod end or upper side of the piston will displace less liquid or oil then the lower side thereof. While the resultant differential in the amounts of fluid pumped by the two pump cylinders is not of particular consequence, the resultant tendency of the pumping liquid to by-pass the piston has heretofore been of serious concern.

For purposes of minimizing the adverse effects consequent upon the differential in the effective or exposed areas of the opposite sides or ends of the piston 48, the piston is formed of a relatively large diameter in relation to the diameter of the piston rod 50 so as to minimize the area differential in the first instance. Secondly, the piston comprises a hollow cylinder open at its larger area or lower end to reduce piston inertia, thus minimizing mechanical shock loading on the seals and minimizing liquid pulsation on stroke reversal.

Nevertheless, it must be recognized that there is a differential in piston areas and that the seal 58 must be highly effective.

Referring to FIG. 4, the piston seal 58 provided by the present invention comprises a cartridge 60 which contains a pair of separate, one-way, sealing assemblies 62 and 64. The cartridge 60 comprises a hollow cylinder having a smooth outer surface in which are formed five circumferential grooves 66, each of which contains a three element seal for sealing the cartridge to the wall of the cylinder 42. In the preferred structure, each said seal comprises two flat gaskets and an interposed O-ring seal. The cartridge 60 at its lower end engages a shouldered recess 68 formed in the cylinder 42 and at its upper end is securely held in place by a shouldered ring fastener 70 threaded into a threaded portion of the cylinder wall.

On the interior of the cartridge 60, at about its midpoint, a radially inwardly extending flange 72 is formed, the inner diameter of which is slightly larger than the outer diameter of the piston 48 to avoid contact therewith. One end of each of the two sealing assemblies 62 and 64 abuts the flange 72. The other end of the lower assembly 64 abuts a snap ring 74 seated in a groove formed in the inner wall of the cartridge, and the other end of the upper assembly 62 abuts the ring fastener 70.

The sealing elements 62 and 64 are identical, but of opposite hand, and starting from the flange 72 each comprise a back-up member or bearing 75, suitably formed of "Delrin" or "Teflon," having a first end surface abutting the flange 72 and an opposite end surface juxtaposed to a second radially inwardly extending flange 76 on the cartridge 60. Confined within the space between the bearing 75 and flange 76 is a self-energizing, spring-loaded, U-shaped, one-way, low-pressure seal 77 facing in the direction away from the bearing 75. On the opposite side of the flange 76, there is an adapter 78, preferably formed of "Delrin," having a flat surface abutting the flange 76 and an opposite chevron or V-shaped surface facing away from the flange. Next a sandwich of chevron seals of alternating materials 79 and 80 is provided, in the forms perferably of four or five layers of Teflon 79 and three or four interposed layers of elastomer 80. Backing up the sandwich of sealing elements is another adapter 81, again preferably formed of Delrin, having a V-shaped surface mating with the chevron seals and a flat outer surface. At said flat outer surface, the adapter 81 is provided with a plurality of circumferentially spaced holes therein each adapted for reception of a coil compression spring 82. The springs 82 react against a backing plate 84 which engages and is held in place in the case of the lower seal assembly by the snap ring 74 and in the case of the upper assembly by the ring fastener 70.

By virtue of this construction, each of the assemblies 62 and 64 comprises a one-way seal guarding against leakage from the adjacent side of the cylinder and serving to retain the liquid in the respective side of the cylinder. By virtue of the flanges 72 and 76 gormed on the cartridge 60, the seals 77 are independent of one another and the chevron seal assemblies 79–80 and form excellent one-way seals protecting against leakage when the pump is operated at low pressures. In particular, the back-up seals 77 allow the pump to operate without a low pressure limit, since they do not rely on hydraulic pressure for their sealing capabilty and efficiency. Thus, the seals 77 have sealing capability from essentially zero psi up to a load limit in excess of the lower limit of the sealing capacity of the chevron seals 79–80, e.g., up to 400 psi. Likewise, the two chevron seal assemblies 79–80 are independent of one another and the low pressure seals 77, and are independently held under predetermined sealing pressure by the respective spring assemblies 82 to form excellent high pressure seals protecting against leakage when the pump is operated within the range of approximately 100 psi to and in excess of 2200 psi.

Thus, each of the sealing assemblies 62 and 64 provides a one-way seal operating over a very wide pressure range and opposing the flow of liquid from the adjacent side of the cylinder 42 as that side is being pressurized by movement of the piston 48 toward that side. Unlike the prior art single seal of the two-way type, each of the seals 77 and 79-80 works independently of the others because the intervening flanges 72 and 76 isolate each seal from the others. Each seal is therefore free to react in its own way and is required to seal against liquid flow in one direction only, and hence can better accomplish its task. Also, each of the high pressure seal assemblies is independently maintained under predetermined pressure to enhance seal life and to maintain each seal individually effective irrespective of the other seal assembly.

Also, as will be observed from FIGS. 1 and 4, both the piston 48 and the piston rod 50 have substantial clearance relative to the cylinder 42 and the end cap 44 so that the same can be self-centering in their respective seals. This structural feature, combined with the fact that there is no balance rod and no balance rod seal, contributes significantly to the service life and effectiveness of the seals. Contributing further to piston and seal alignment, integrity and service life is the provision and utilization of the six backing members 75, 78 and 81 as bearings for the piston 48 causing the piston and the seals to be aligned and in optimum engagement with one another.

Not only has the life of the critical piston sealing means 58 thus been extended, but means have also been incorporated in the seal assembly to prevent leakage across the seal from one side to the other side thereof, so that while one side of the control cylinder might suffer an undersupply of oil, neither side can become over filled and cause tube implosion and failure of the pump. Specifically, as shown in FIG. 4, the flange 72 separating the two seal assemblies 62 and 64 is provided with a plurality of radial ports 86 therein leading to an annular or peripheral groove 88 in the outer surface of the cartridge 60, which groove in turn communicates with a radial hole 90 in the wall of the cylinder 42. Consequently, any pumping liquid seeping past either of the seal assemblies into the space therebetween is bled out of the pump via the ports 86, 88 and 90, and cannot be forced past the other seal assembly into the opposite side of the cylinder. This is a further and specific advantage of the double seal assembly and the seal separating flange 72, since the non-leaking seal provides sufficient resistance to flow to force any liquid seeping past the leaking seal harmlessly out the port 90. The seal thus provides a solution for a long-standing problem in the flexible tube pump art, namely the inability to determine liquid transfer past the seal and consequent pump destruction from an undetectable cause.

Further in accord with the present invention, indicator means are provided in conjuction with the port 90 to facilitate quick detection of a leaking seal so that the seal can be replaced before any harm is done to the pump. In particular, an indicator 92, suitably in the form of a sight glass 93, is coupled to the port 90 by a threaded fitting or adaptor 94 and an elbow 95. Consequently, any liquid leaking past either of the seal assemblies 62 or 64 will accumulate in the sight glass to detect and immediately indicate the fact of leakage. Actually, liquid leaking from the port 90 could likewise serve as an indicator, but the sight glass is far more convenient and also allows volumetric measurement of leakage. In addition, pumps of the general character are frequently operated in very dirty environments and it is therefore preferable that the port 90 be sealed from the atmosphere to prevent seal contamination.

For the same reason as last stated, the indicator 92 is also preferably sealed from the atmosphere and is equipped at its upper end with a low pressure check valve 96, which permits upward discharge of liquid from the sight glass but prevents entry to the sight glass and the seal of atmospheric air and foreign matter. Thus, the sight glass contributes to quick indication and detection of a leaking seal and at the same time maintains the closed circuit intregity of the pump.

In addition, the sight glass 93 serves as a piston and seal lubricator during normal operation of the pump. Conventionally, the liquid employed in the pump is hydraulic fluid having a reddish color. By partial filling of the sight glass with a conventional oil having an amber color, the oil will flow through the ports 90, 88 and 86 and fill the space inwardly of the flange 72 between the two seal assemblies 62 and 64, and thereby provide lubrication for the piston and the seals. Should a leak subsequently occur, the red hydraulic fluid will mix with the amber oil and will, as leakage continues, fill the sight glass. Thereupon, the sight glass will reveal the reddish fluid in contrast to the customary amber oil, and when the sight glass fills completely the operator will be promptly informed that a problem exists. If the leakage is not severe, the problem may be resolved by adding hydraulic fluid to the pump to prevent or at least forestall the need for major maintenance. Seal replacement is not required until leakage becomes severe. Thus, the seemingly simple expedient of a sight glass in combination with the flange 72 of the double seal provides a self-contained system which maintains the closed circuit integrity of the pump, lubricates the piston and the seal, and detects and indicates seal leakage.

Referring to FIG. 6, the piston rod 50 is similarly provided with a combined bearing and seal assembly 52 very much like a respective one of the one-way seal assemblies 62 and 64. Since hydraulic pumping fluid is on one side only of the end cap 44, only a single one-way sealing assembly is required. As shown, using reference numerals in the one-hundred series comparable to those used in describing the seal 62 and 64, the seal assembly 53 comprises a cylindrical cartridge 160 inserted into the end cap 44 and sealed thereto by a pair of three member gaskets 166, an upper back-up or bearing member 175 inserted into the cartridge and having a lower surface juxtaposed to a radial flange 176 on the cartridge, a self-energizing, spring-loaded, inverted U-shaped, low-pressure seal 177 confined between the bearing 175 and the flange 176, a second back-up member 178 engaging the lower side of the flange 176 and having a downwardly facing inverted V-shaped surface, an alternating assembly of four or five Teflon seals 179 and three or four elostomeric seals 180, a lower back-up member or adapter 181 engaging the lowermost of the seals 179, a plurality of circumferentially spaced compression springs 182 biasing the member 181 upwardly, and a backing plate or member 184 for the springs which is confined against an internal shoulder 174 on the end cap 44. In addition, the backing member 184 is recessed for reception therein of a lower bearing member or backing 185 for the piston rod. The seal cartridge assembly 53 is retained within the end cap by a ring fastener 170 which engages the cartridge 160 and the upper bearing member 175 and serves to prestress the springs 182 and constrain the self-energizing back-up seal 177.

Thus, the piston rod 50 is provided with a one-way seal that is highly effective at both high and low pressures and that provides bearing surfaces 175, 178, 181 and 185 insuring proper alignment and engagement of the piston rod and its seal.

Above the seal assembly 53, a cup-shaped recess 186 is formed in the ring fastener 170 for reception of lubricating oil, which will (a) lubricate the seal 53 and the bearing members thereof, (b) provide a vacuum seal preventing inspiration of air into the pump on the downstroke of the piston, and (c) provide an indicator (by color-change and/or overflow) for leakage of the reddish hydraulic fluid from the pump past the seal 53.

Further to maintain the alignment and the integrity of the pump seals, the piston rod 50 is connected to the drive rod 100 of the motor (not shown) for operating the pump by means of a self-aligning coupling 52. As shown in FIG. 7, this coupling in its preferred embodiment comprises a piston rod adapter 101 threadedly secured to the upper end of the piston rod and locked thereto by radial locking members 102 and 103, a motor rod adapter 104 threaded onto the motor rod 100 and similarly locked thereto, and a cylindrical nut 105 having an internal flange engaging a complementary external flange on the motor rod adapter and threaded onto the piston rod adapter for securing the two adapters and the two rods together in end to end relationship. The motor rod adapter 104 and the nut 105 are so dimensioned relative to one another as to provide radial clearance therebetween and thereby compensate for any radial displacement between the two rods. As a consequence, the two rods may be brought into flush, firm, metal to metal, end-to-end engagement with one another as shown in FIG. 7. When assembled, the nut 105 is locked to the adapter 101 by the lock 103 to maintain this preset assembly. Also, a pair of Bellville spring washers 106 are preferably employed between the two adapters to serve as lock washers for the assembly.

As a consequence of the described construction, the piston and piston rod have optimum sliding engagement with their seals and the seals are so constructed and assembled as to provide both perfect vacuum retention and perfect pressure retention, with miniscule fluid leakage, over millions of cycles of operation of the pump. In addition the construction of the pump is such that, except for filling the lower pump chamber via the fill plug 49, the pump can be assembled and disassembled in an upright vertical position, which is of great advantage in the larger sizes of pumps. Also, the ability of the pump to operate over a wide range of pressures, e.g., from essentially zero psi to pressures in excess of 2200 psi, permits the pump to be used for a wide variety of purposes ranging from liquid transfer to high pressure spraying.

Thus, the present invention has been shown to provide very significant improvements and advantages in the constuction, operation and maintenance of pumps of the flexible tube type. Consequently, while the preferred embodiment of the invention has been herein illustrated and described, it will be appreciated that various changes, rearrangements and modifications may be made therein without departing from the scope of the invention, as defined by the appended claims.

What is claimed is:

1. In a flexible tube pump, a pair of substantially identical pump cylinders each having inlet and outlet openings and a flexible tube in each said cylinder connected at its ends to the inlet and outlet openings thereof; each said connection comprising a frusto-conical recess in the cylinder wall, a hollow stem extending through said opening and having an enlarged frusto-conical head portion complementary to and juxtaposed to said recess comformably receiving the end of the tube, means for drawing said head portion toward and into said recess for compressing the end of the tube between said frusto-conical surfaces, and means on said stem for maintaining a clamping pressure on the tube end; a single control cylinder communicating adjacent one end thereof with one of said pump cylinders exteriorly of the respective tube and adjacent the other end thereof with the other pump cylinder exteriorly of the respective tube; and a single piston reciprocable in said control cylinder; the improvement comprising two spaced apart seals mounted in said control cylinder and sealingly engaging said reciprocable piston intermediate the two ends of said control cylinder; liquid having a visually detectable coloring; said liquid filling the pump cylinders exteriorly of said tubes and the control cylinder to opposite sides of said two seals; a piston rod connected to and extended from only one end of said piston and extending through only one end of said control cylinder for reciprocating said piston and displacing said liquid and thereby alternately and cyclically contracting and expanding said tubes to perform a pumping function; the end of said piston opposite said piston rod being unobstructed, hollow and having a larger effective piston area than the other end of said piston, said piston being of relatively large diameter in relation to the diameter of the piston rod for minimizing the differential between the effective areas of the two ends of the piston and thus the liquid displacement thereof; and a sight glass in communication with said control cylinder in the space therein between said two seals, whereby the liquid leaking past either seal, itself, gives a signal when it is detected in said sight glass and before it passes the other seal so that damage to said tubes is averted.

2. In a flexible tube pump as in claim 1, further comprising a one-way valve, said sight gauge having one end in communication with said space between said two seals and its other end closed by said one-way valve, said one-way valve permitting said liquid leaking past either seal to enter said sight glass, while preventing contaminants from the environs entering said sight gauge.

* * * * *